(12) United States Patent
Macklin et al.

(10) Patent No.: US 8,097,666 B2
(45) Date of Patent: Jan. 17, 2012

(54) CEMENT ADDITIVE FOR STUCCO APPLICATIONS

(75) Inventors: Michael B. Macklin, Auckland (NZ); Mark A. Franciosi, Westminster, MA (US); Leslie A. Jardine, Burlington, MA (US); Byong-wa Chun, Newton, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 12/599,208

(22) PCT Filed: Apr. 30, 2008

(86) PCT No.: PCT/US2008/062034
§ 371 (c)(1),
(2), (4) Date: Nov. 6, 2009

(87) PCT Pub. No.: WO2008/150604
PCT Pub. Date: Dec. 11, 2008

(65) Prior Publication Data
US 2010/0249280 A1    Sep. 30, 2010

Related U.S. Application Data

(60) Provisional application No. 60/940,794, filed on May 30, 2007.

(51) Int. Cl.
C04B 28/02 (2006.01)
(52) U.S. Cl. .......................................................... 524/4
(58) Field of Classification Search .................. 524/4
See application file for complete search history.

(56) References Cited

U.S. PATENT DOCUMENTS

| | | | |
|---|---|---|---|
| 2,131,533 A * | 9/1938 | Daimler et al. | 106/727 |
| 4,135,940 A * | 1/1979 | Peltier | 106/678 |
| 4,351,912 A | 9/1982 | Jasperson | |
| 4,507,280 A * | 3/1985 | Pohl et al. | 424/70.17 |
| 4,943,323 A | 7/1990 | Gartner et al. | |
| 5,175,278 A | 12/1992 | Peik et al. | |
| 5,550,224 A | 8/1996 | Hazen | |
| 5,782,972 A | 7/1998 | Abelleira et al. | |
| 6,048,393 A | 4/2000 | Cheung et al. | |
| 6,110,271 A | 8/2000 | Skaggs et al. | |
| 6,117,226 A | 9/2000 | Dial et al. | |
| 6,172,147 B1 | 1/2001 | Abelleira et al. | |
| 6,213,415 B1 | 4/2001 | Cheung | |
| 6,290,772 B1 | 9/2001 | Cheung et al. | |
| 6,358,311 B1 | 3/2002 | Arai et al. | |
| 6,451,880 B1 | 9/2002 | Jardine | |
| 6,620,775 B2 | 9/2003 | Winston et al. | |
| 7,160,384 B2 | 1/2007 | Jardine | |
| 2001/0052308 A1 * | 12/2001 | Yamashita et al. | 106/728 |
| 2004/0072715 A1 | 4/2004 | Griese et al. | |
| 2004/0072939 A1 | 4/2004 | Cornman et al. | |
| 2004/0149172 A1 | 8/2004 | Jardine et al. | |
| 2005/0092209 A1 * | 5/2005 | Garner | 106/698 |
| 2006/0280970 A1 | 12/2006 | Lettkeman et al. | |
| 2006/0281835 A1 | 12/2006 | Ong | |

FOREIGN PATENT DOCUMENTS

| | | |
|---|---|---|
| DE | 102005039824 A1 | 3/2007 |
| EP | 1533287 | 5/2005 |
| JP | 2005001965 A | 1/2005 |
| WO | 9722564 A1 | 6/1997 |
| WO | 9727152 | 7/1997 |
| WO | 9944966 | 9/1999 |
| WO | 2005090424 A | 9/2005 |

OTHER PUBLICATIONS

SIKA AER MSDS. Aug. 2007.*
Christensen, B. J., "The influence of viscosity-modifying admixture (VMA) on the performance of self-consolidating concrete (SCC)". American Concrete Institute, SP (2006), SP-233(Workability of SCC), 233.2/1-233.2/16.
ASTM C897-00 Standard Specification for Aggregate for Job-Mixed Portland Cement-Based Plasters, ASTM International, West Conshohocken, PA, www.astm.org. (2000) [downloaded from internet: Jul. 30, 2008].
Form PCT/ISA 210, International Search Report for International Patent Application No. PCT/US2008/062034, dated Aug. 6, 2008, 2 pages.
Form PCT/ISA/237, Written Opinion of the International Searching Authority for International Patent Application No. PCT/US2008/062034, dated Aug. 6, 2008, 5 pages.
Sibelzor, "Investigation of the adsorption of anionic surfactants at different pH values by means of active carbon and the kinetics of adsorption", J.Serb.Chem.Soc. 69(1)25-32 (2004).

* cited by examiner

Primary Examiner — Milton I Cano
Assistant Examiner — John Uselding
(74) Attorney, Agent, or Firm — Craig K. Leon; Stephan P. Williams

(57) ABSTRACT

An additive composition, a cement composition, and method for modifying rheology of an uncured masonry cement, comprising the use of at least one extra-cellular biopolymer, at least one anionic surfactant, and at least one cationic or amphoteric surfactant. Preferably, the biopolymer and surfactants are incorporated into the cement by incorporating the components into the grinding of clinker as part of the manufacture of the cement. Masonry cements produced by the invention have excellent workability, particularly when coarse sands are employed.

8 Claims, No Drawings

CEMENT ADDITIVE FOR STUCCO APPLICATIONS

This Application is a National stage entry of PCT/US08/62034 filed Apr. 30, 2008 which claims priority from Provisional Application 60/940,794 filed May 30, 2007.

FIELD OF THE INVENTION

The present invention relates to an additive and process for modifying a masonry cement, and more particularly for modifying rheological properties in masonry cement used in stucco applications. The cement additive and process comprise the use of at least one extra-cellular biopolymer, an anionic surfactant, and an amphoteric or cationic surfactant.

BACKGROUND OF THE INVENTION

Stucco is a masonry mortar applied as a thin coating to an outer building surface. It may be applied by trowel or spray-applied using pressurized equipment. Stucco is made from a special Portland cement known as a masonry cement, which contains a limestone mixed with water and sand.

It is known to incorporate additives into masonry cements to enhance certain properties. For example, U.S. Pat. No. 6,451,880 describes the use of such cement additives to impart air entertainment ability, workability, and board life properties. A certain level of workability in stucco is required to allow, for example, proper hand application using a trowel. As defined in the '880 patent, "workability" means and refers to the consistency and feel of the mortar when it is trowel-applied by a skilled mason. The masons prefer that their mortars have a particular ease of movement, a desirable plasticity or "fattiness" that translates to easy application, as well as a certain degree of "body" or cohesiveness that holds the mortar together. In other words, stucco should remain in place once applied to a surface; it should not fall off, sag, or otherwise move unless physically displaced or shaped by hand trowel.

In addition to having workability and sufficient body, stucco must resist setting up (or hardening) too fast when spray applied using pressurized equipment. Because spray equipment is moved from place to place at a typical construction site, where delays of 10-15 minutes are not uncommon, the stucco material must resist setting in the spray hose and nozzle, or otherwise this expensive equipment could be ruined.

The nature of the sand aggregate used in stucco can adversely affect the workability of the stucco. For example, masonry contractors typically employ a clean sand aggregate that conforms to ASTM C-897 (2000) in order to limit their liability. This sand is considered to be a "clean" type of sand because it contains relatively smaller amounts of very fine particulates. One advantage of this coarser sand is its relatively smaller water demand and consequently smaller shrinkage-cracking feature when compared to finer sands. However, due to its coarser nature, this sand can make the stucco less "workable" from the viewpoint of the masonry contractor.

The "sand carrying capacity" of a masonry mortar refers to the maximum amount of sand that can be added without defeating the workability of the mortar. Use of a masonry cement with a high sand carrying capacity is beneficial. Masons are allowed to prepare masonry mortar or stucco with a 4:1 ratio of sand to cement. Masonry mortar and stucco having high levels of sand have an advantage in decreased costs, lower shrinkage, and lower cracking tendencies, but have a disadvantage in terms of a higher potential for brittleness.

Masons are usually not able to realize the economic benefits of employing a 4:1 ratio in their mix designs, however, due to factors that limit the workability of their mortar cements, such as the coarseness of sand as just mentioned. The ratio of sand to cement is more often limited to below 2:1 due to the limited workability of the stucco.

To remedy limitations in stucco workability, masons can increase the levels of particle fineness in their mortar cement. There are several approaches to accomplishing this. For example, the cement portion can be increased, but this can increase costs and the tendency for shrinkage and cracking, as previously mentioned. Another possibility is to incorporate bentonite and other clays to increase the portion of the fines, but this may be undesirable if the final physical properties of the resultant stucco are changed.

Certain high performance masonry cement additives can be used to increase workability of masonry cement. However, performance may not be optimized for a stucco application with ASTM graded sands wherein a high level of adherence and a high sand carrying capacity is required. Thickeners can be used to increase water retention, workability, and board life of masonry cement. For example, U.S. Pat. No. 6,451,880 disclosed the use of cellulose ethers.

In view of the prior art, it is believed that a novel cement additive and process is needed for modifying the rheological qualities of masonry cement and stucco, and in particular stucco mortars prepared with coarse ASTM graded sand.

In surmounting the disadvantages of the prior art, the present invention provides a cement additive that employs an extra-cellular biopolymer in combination with an anionic surfactant and amphoteric or cationic surfactant to provide mortar cements having desired rheological properties for stucco prepared with coarse sand.

While diutan S-657 biopolymer has previously been used in cementitious compositions, the present inventors believe that such applications do not involve highly entrained air as in the presently described stucco applications. For example, published US patent application No. 20060280970 A1 disclosed grout compositions in which defoamers were used to reduce air bubbles formed during mixing of the composition with water, such that high strength flooring could be achieved. As another example, published US patent application No. US 2004072939 A1 (of Cornman et al.) taught that both foamers and anti-foaming agents can be used to stabilize the formulation using diutan S-657 biopolymer among others, but this reference did not focus on entraining air alone for stucco applications, and in fact teaches that it is preferable to use defoaming agents, such as tributyl phosphate (See e.g., Paragraph "0039").

SUMMARY OF THE INVENTION

In surmounting the disadvantages of the prior art, the present invention provides an additive composition, a method for modifying the rheology of a mortar cement, and a cementitious composition, involving a combination of an extra-cellular biopolymer, anionic surfactant, and cationic or amphoteric surfactant, which achieves excellent "workability" in masonry cement and particularly for stucco applications. The term "workability" means and refers to the ability of the wet mortar to move easily using a mason's trowel.

Exemplary extra-cellular biopolymers are operative to increase viscosity of aqueous (uncured) cementitious compositions having a pH in the range of 11-13.5. A preferred biopolymer is diutan (S-657) biopolymer, which is available from CP Kelco and is described in U.S. Pat. No. 5,175,278. While diutan biopolymer is preferred, the present inventors also believe that other biopolymers suitable for use in the present invention may be selected from welan, gellan, rhamsan, and xanthan.

In combination with the extra-cellular biopolymers, the present invention incorporates two different surfactant systems. The anionic surfactant provides quick foaming activity in the mortar cement, while the cationic or amphoteric surfactant provides stable foam that is helpful for the working life of the mortar cement. Hence, the invention achieves the desired workability in mortar cement even when relatively coarse sand aggregate is used, such as graded sand in accordance with ASTM C-897 (2000).

An exemplary additive composition of the invention comprises: (a) at least one extra-cellular biopolymer in an amount of 0.01%-2.0%, the biopolymer being operative to increase the viscosity of an aqueous cementitious suspension having pH in the range of 11-13.5; (b) at least one anionic surfactant in an amount of 0.5%-50.0%; and (c) at least one cationic or amphoteric surfactant in an amount of 0.5%-50.0%, all percentages herein based on weight of the additive composition.

A preferred additive composition, provided in the form of an aqueous or non-aqueous liquid composition, comprises diutan S-657 biopolymer, an anionic surfactant such as sodium alkyl ethoxy sulfate, and an amphoteric surfactant such as sodium lauriminodipropionate.

An exemplary method of the invention comprises combining the above-described biopolymer and surfactants with cement clinker before or during the intergrinding of clinker, optionally with argillaceous and/or pozzolanic materials, to produce finished cement. The rheological benefits of the invention are realized when the cement is combined with sand or coarse sand and employed as masonry cement. This is especially true in stucco applications, because the additives help to maximize workability, water retention, and hence the sand-carrying capacity of the cement. Exemplary mortars made with the cement additives of the invention can have an air content of 12-25 percent.

Further advantages and features of the invention are described in further detailed hereinafter.

DETAILED DESCRIPTION OF EXEMPLARY EMBODIMENTS

Portland cement clinker is prepared by sintering a mixture of components, including calcium carbonate (as limestone), aluminum silicate (as clay or shale), silicon dioxide (as sand) and miscellaneous iron oxides. During the sintering process, chemical reactions take place wherein hardened nodules, commonly called clinkers, are formed. After cooling, the clinker is pulverized together with a small amount of gypsum (calcium sulfate) in a finish-grinding mill to provide a fine, homogeneous powdery product known as Portland cement.

Cementitious compositions prepared by processes of the invention thus comprise primarily cement made from cement clinker. Accordingly, such compositions preferably have at least 15% by weight of Portland cement, and more preferably at least 50%. Secondary argillaceous or pozzolanic materials, which may be considered to be supplemental or secondary cementitious materials ("SCM"), may also be mixed with the cement clinker, such as clay, natural pozzolan, flyash, limestone, granulated blast furnace slag, cement kiln dust, or a mixture thereof, to provide a hydratable cementitious composition. Such SCM materials by themselves are not believed to have binding characteristics, but when combined with cement such SCM materials appear to contribute to or enhance the binding effect of the cement, and hence will be considered as part of the cementitious material.

The additive compositions of the present invention, and methods employing such compositions, are suitable for use on conventional cement grinding mills, including without limitation ball mills and mills having rollers (the latter being described, for example, in U.S. Pat. No. 6,213,415 of Cheung, incorporated herein by reference). As described hereinafter, the additive compositions may be added to or before cement clinker during the "intergrinding" manufacturing process whereby clinker is ground to form the hydratable cement powder, which is the binder in masonry cements and concretes.

In describing the amounts of the extra-cellular biopolymer (e.g., diutan) and surfactants to be used in the present invention, the present inventors may characterize the amounts of such components based on the weight of the "cementitious material" being treated (e.g., the dry weight of the Portland cement and any SCM that is interground with the cement). Alternatively, if such components are described in terms of an additive composition that is to be introduced as a pre-mixed agent to the clinker before or during the grinding operation in the manufacture of cement, the components will be described based on percentage of total weight of the additive composition.

As previously mentioned, a preferred extra-cellular biopolymer is diutan (S-657) that is commercially available from CP Kelco. Exemplary biopolymers believed to be suitable for use in the present invention include diutan, welan, gellan, rhamsan, and xanthan, with diutan being preferred. Such polymers are water-soluble or partially water-soluble and made by fermentation of carbohydrates. The inventors prefer diutan (S-657) for its shear-thinning characteristic in that it has a viscosity-decreasing effect when incorporated into aqueous (uncured) cementitious compositions that are subject to shearing forces. In addition to the biopolymer, the exemplary mortar cements of the present invention will comprise the aforementioned surfactants, sand aggregate, e.g., coarse sand graded according to ASTM C-897 (2000), and optionally argillaceous or pozzolanic materials, such as limestone, fly ash, slag, etc, as part of the cementitious material (cement including SCM).

The lower limit of the content of additive for cementitious materials of the present invention (weight ratio to total weight) is 0.01 wt %, and the upper limit of the same is 1.5 wt %, all percentages based on dry weight of the cementitious material (e.g., cement including SCM). Preferably, the total content of additive will be 0.05 to 0.5%.

As mentioned above, the preferred method for incorporating the biopolymer and surfactants is by addition during the cement production process wherein Portland cement clinker and secondary cementitious materials (SCM) are interground to provide finished cement powder. For example, the biopolymer and surfactants can be added during pulverization of the mixture of cement clinker, gypsum, limestone, and other SCM. They can also be added after pulverization. In addition, the additives can be added as each component of the cementitious material is being ground individually. Moreover, they can also be added after the grinding process. Also, the additives may be incorporated into the grinding of any of the additives, such as the grinding of limestone, slag, or fly ash during the manufacturing process wherein such SCM are produced. Thus, when the additives of the present invention are added during concrete or mortar production, they can be added to any one of the materials, or to several of the materials that will be used, and they can also be added during mixing of the materials.

Additives of the invention will sometimes be described using their ionic and/or salt forms, and it will be understood that description of the salt form will necessarily encompass the ionic form that results when such salt is introduced into an aqueous environment.

An exemplary additive composition of the invention for modifying the rheology of a mortar cement, thus comprises at least one extra-cellular biopolymer selected from the group consisting of diutan, welan, gellan, rhamsan, and xanthan, the biopolymer being present in an amount of 0.01% to 2.0%; at least one anionic surfactant in an amount of 0.5% to 50%; and at least one cationic or amphoteric surfactant in an amount of 0.5% to 50%, all percentages herein based on the weight of the additive composition.

The additive composition can be provided in aqueous or non-aqueous liquid form whereby the biopolymer(s) and surfactants are premixed and introduced to cement clinker before or during the intergrinding thereof to produce finished cement. For example, a suitable non-aqueous liquid is polyethylene glycol or an alkanolamine such as triethanolamine, diethylene glycol, triisopropanolamine as described in U.S. Pat. No. 4,943,323, or hydroxyamines such as N,N-bis(2-hydroxyethyl)-2-propanolamine or such other amines as disclosed in U.S. Pat. Nos. 6,048,393; 6,290,772; alkanolamines such as disclosed in U.S. Pat. No. 6,358,311; and the triethanolamine/tetrahydroxyethylethylene diamine compositions described in U.S. Pat. No. 7,160,384 of Jardine.

Alternatively, the biopolymer(s), anionic surfactant, and cationic or amphoteric surfactant can be introduced individually into the cement or cement materials before, during, or after the cement clinker intergrinding process.

Exemplary anionic surfactants contemplated for use in the invention include a sulfate anion, sulfonate anion, carboxylate anion, or a mixture thereof. For example, the anionic surfactant can be a sodium, potassium, or ammonium alkyl ethoxy sulfate having a $C_6$-$C_{16}$ alkyl group, such as sodium lauryl ethoxy sulfate. Further exemplary anionic surfactants may include sodium dodecyl sulfate, ammonium lauryl sulfate, sodium laureth sulfate, and/or alkyl benzene sulfonate.

The present inventors believe that anionic surfactants tend to generate foam quickly in the aqueous cementitious matrix, but elevating alkaline conditions diminish this foaming action within a short period of time. The present inventors also believe that the high ionic strength of the cement pore water, especially due to the elevating level of $OH^-$ ions therein, disrupts the interaction between anionic surfactants and water. They further believe that the presence of calcium ions impedes interactions between water and hydrophilic (or anionic) ends of the anionic surfactant molecules; or, alternatively, that the anionic surfactants are precipitated out of solution as calcium salts. In either case, anionic surfactants are seen to lose their effectiveness when pH becomes highly alkaline, such as in uncured cementitious compositions (e.g., pH=11-13.5).

In addition to using one or more anionic surfactants, the present inventors also employ at least one cationic or amphoteric surfactant to provide a stable foam needed for the working life of the mortar cement (or stucco). An exemplary cationic surfactant is a quaternary ammonium cation. These are positively charged polyatomic ions of the structure $NR^{4+}$ with R representing alkyl groups. Unlike the ammonium ion $NR^{4+}$ itself and primary, secondary, or tertiary ammonium cations, the quaternary ammonium cations are permanently charged, independent of the pH of their solution. Quaternary ammonium cations are synthesized by complete alkylation of ammonia or other amines. Exemplary quaternary ammonium cations include alkyltrimethylammonium salt, cetylpryridinium chloride (also referred to as hexadecyl trimethyl ammonium bromide), polyethoxylated tallow amine, benzalkonium chloride, and benzethonium chloride.

It is believed that the ability of the quaternary ammonium cations to remain permanently charged allows for extended foaming in the high pH cement pore water.

Exemplary amphoteric surfactants include sodium lauriminodiproprionate, dodecyl betaine, dodecyl dimethylamine oxide, cocamidopropyl betaine, and coco ampho glycinate. (Note that the $C_{12}$ alkyl group can be replaced by a $C_6$-$C_{18}$ alkyl groups. Amphoteric surfactants are also known as zwitterionic surfactants. Amphoteric compounds have both positive and negative charges on different atoms. A preferred amphoteric surfactant is sodium lauriminodipropionate.

A preferred additive composition of the invention for modifying the rheology of masonry cement therefore comprises diutan S-657 biopolymer, sodium alkyl ethoxy sulfate, and sodium lauriminodipropionate. Further exemplary embodiments may optionally include polyethylene glycol, an alkanolamine (e.g., triethanolamine, triisopropanolamine), or mixture thereof.

An exemplary method of the invention for modifying a mortar cement, comprises: introducing to cement clinker before or during the intergrinding manufacture process of said cement clinker to produce cement, at least one extra-cellular biopolymer (e.g., diutan), the biopolymer being present in said aqueous composition in an amount no less than 1.0 ppm and no greater than 100.0 ppm (ppm for biopolymer means and refers to parts per million of active biopolymer for each part of dry weight of cementitious material); at least one anionic surfactant in an amount no less than 2.8 ppm and no greater than 2800 ppm; and at least one cationic or amphoteric surfactant in an amount no less than 1.5 ppm and no greater than 180.0 ppm (wherein ppm for surfactants means and includes parts per million of active surfactant for each part of dry weight of cementitious material.

Again, the components may be introduced to the cementitious material in the form of a pre-mixed aqueous or non-aqueous liquid or as separate components.

In preferred methods of the invention, the components are pre-mixed into an aqueous liquid (a water solution) or non-aqueous liquid (polyethylene glycol; triethanolamine (TEA), triisopropanolamine (TIPA), or other alkanolamine) and combined with cement clinker before or during the intergrinding of the clinker to produce hydratable cement powder. For example, the components may be combined into TIPA or formulated to provide a solution or emulsion in which TIPA, TEA, or combination of TIPA and TEA are included.

The invention therefore also provides a hydratable cement composition having the afore-mentioned biopolymer and surfactants, which have preferably been combined with the cement by intergrinding them with cement clinker in the manufacturing process to produce the finished hydratable cement powder.

In further exemplary embodiments, the cement composition comprises sand, such as a coarse sand that is graded in accordance with ASTM C-897 (2000).

While the invention is described herein using a limited number of embodiments, these specific embodiments are not intended to limit the scope of the invention as otherwise described and claimed herein. Modification and variations from the described embodiments exist. More specifically, the following examples are given as specific illustrations of embodiments of the claimed invention. The invention is not limited to the specific details set forth in the examples. All parts and percentages in the examples, as well as in the remainder of the specification, are by weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed: R=RL+k*(RU−RL), where k is a variable ranging from 1% to 100% with a 1% increment, e.g., k is 1%, 2%, 3%, 4%, 5% . . . 50%, 51%, 52%, . . . 95%, 96%, 97%, 98%, 99%, or 100%. Moreover, any numerical range represented by any two values of R, as calculated above, is also specifically disclosed.

The following examples are provided for the purposes of illustration only, and are not intended to limit the scope of the invention.

Example 1

Mortars prepared with various masonry cement additives were rated for workability, creaminess, bleeding, and stickiness during the first 90 minutes after mixing with water. Workability is the ability a mortar to move easily with a mason's trowel. Creaminess describes the mortar's paste fraction. The paste should appear moist and slightly viscous. The paste should maintain a cohesive quality of the mortar. While mortar should appear moist, excessive bleeding is a negative property. Bleeding is evident if the water appears to be separating from the cement portion of the paste, exposing individual sand particles, and making the mortar appear and feel grainy. For stucco, stickiness is a desirable property as long as the mortar does not appear dry. A plastic, cohesive mortar with a high level of stickiness should have good adherence while resisting sagging, cracking, and de-bonding. On a scale of 1 to 5, with 5 designating the highest possible characteristic, the average masonry technician rating was 4.7

An exemplary additive of the invention was mixed and then used directly in a mortar cement to evaluate the properties of workability, creaminess, bleeding, and stickiness. The diutan S-657 biopolymer is commercially available from CP Kelco (Atlanta, Ga.). Exemplary additives of the invention can employ diutan (S-657) biopolymer in aqueous solution or in non-aqueous solution, such as in an alkanolamine carrier (e.g., triethanolamine). The diutan S-657 biopolymer can also be used in the form of an aqueous solution as taught in US Patent Pub. No. 2004/0072939A1, wherein the biopolymer is mixed with a superplasticizer to enhance stability. A similar form of the diutan S-657 biopolymer is available from Grace Construction Products, Cambridge, USA, under the trade name "V-MAR®" 3. Hence, a test additive composition was made by combining the following components:

| Liquid Component | Percentage in formulation |
| --- | --- |
| Water | 37 |
| V-MAR ® 3 composition | 50 |
| Sodium Alkyl (mainly lauryl) Ethoxy Sulfate in Aqueous Solution, 28% | 9 |
| Sodium lauriminodipropionate (30% aqueous) | 4 |

This composition was tested at 2300 ppm (liquid weight based on weight of cement). With this total dosage, the dosage of each component based on weight of the cement material is as follows:

| Liquid Component | Liquid dosage (ppm on cement) | Active component | Active dosage (ppm on cement) |
| --- | --- | --- | --- |
| V-MAR ® 3 | 1150 | Diutan biopolymer | 11.5 |
| Sodium Alkyl (mainly lauryl) Ethoxy Sulfate in Aqueous Solution, 28% | 207 | Sodium Alkyl (mainly lauryl) Ethoxy Sulfate | 58 |
| Sodium lauriminodipropionate (30% aqueous) | 92 | Sodium lauriminodipropionate | 27.6 |

The foregoing additive was mixed directly into a test mortar cement which comprised the following components: cement (ASTM C-1328 (2003)) Type M Cement (1200 g), all purpose sand (4800 g), and water (750 g). The percentage of air in the resultant mortar cement was 24.9% by total volume. This mortar cement was subjected to subjective evaluation using hand trowel, as reflected in Table 1 below. The average score of this sample was 4.7.

TABLE 1

| time of test | Workability | Creaminess | Bleeding | Stickiness |
| --- | --- | --- | --- | --- |
| Initial | 5 | 5 | 5 | 5 |
| 30 min | 5 | 5 | 5 | 5 |
| 60 min | 5 | 5 | 4 | 5 |
| 90 min | 4 | 4 | 4 | 4 |

Example 2

When the diutan S-657 polymer, in the form of V-MAR® 3 liquid additive composition, was used alone without the surfactants, the quality of the result masonry cement was not considered to be as good as with the cement made using the combination of diutan biopolymer with the surfactants. A test additive composition was made by combining the following components in the percentages outlined below:

| Liquid Component | Percentage in formulation |
| --- | --- |
| Water | 50 |
| V-MAR ® 3 composition | 50 |

This composition was tested at 2200 ppm (liquid weight based on weight of cement material). With this total dosage, the dosage of each component based on the weight of cement material is as follows:

| Liquid Component | Liquid dosage (ppm on cement) | Active component | Active dosage (ppm on cement) |
|---|---|---|---|
| V-MAR ® 3 composition | 1100 | diutan biopolymer | 11.0 |

The masonry cement for this control sample was constituted as follows: ASTM C-1328 (2003) Type M Cement (1200 g), all-purpose sand (4800 g), and water (949.2 g). This mortar cement was subjected to evaluation as reflected in Table 2 below. The average score was 2.4, and hence it was determined subjectively that this mortar cement, which contained the diutan biopolymer alone (without the surfactants) did not have qualities that were seen in Table 1 above (for the sample in which the additive of the present invention was used: diutan S-657 biopolymer and surfactants), and the average score was shown to be 4.7.

TABLE 2

| time of test | Workability | Creaminess | Bleeding | Stickiness |
|---|---|---|---|---|
| Initial | 5 | 3 | 2 | 2 |
| 30 min | 5 | 3 | 1 | 2 |
| 60 min | 3 | 3 | 1 | 1 |
| 90 min | 3 | 2 | 1 | 1 |

Example 3

When the surfactants were tested, using polyethylene glycol as a water retention aid and workability aid, the performance was not as good as achieved by the samples made using the additive of the present invention. A test additive composition was made by combining the following components in the percentages outlined below:

| Liquid Component | Percentage in formulation |
|---|---|
| Water | 77 |
| Polyethylene glycol 200 | 10 |
| Sodium Alkyl (mainly lauryl) Ethoxy Sulfate in Aqueous Solution, 28% | 9 |
| Sodium lauriminodipropionate (30% aqueous) | 4 |

This composition was tested at 1700 ppm (liquid weight based on cement material). With this total dosage, the dosage of each component based on the weight of the cement material is as follows:

| Liquid Component | Liquid dosage (ppm on cement) | Active component | Active dosage (ppm on cement) |
|---|---|---|---|
| Polyethylene glycol 200 | 170 | Polyethylene glycol 200 | 170 |
| Sodium Alkyl (mainly lauryl) Ethoxy Sulfate in Aqueous Solution, 28% | 153 | Sodium Alkyl (mainly lauryl) Ethoxy Sulfate | 42.8 |
| Sodium lauriminodipropionate (30% aqueous) | 68 | Sodium lauriminodipropionate | 20.4 |

The mortar composition was constituted as follows: ASTM C-1328 (2003) Type M Cement (1200 g), all-purpose sand (4800 g), and water (729.6 g). The percentage of air in the mortar cement was determined to be 24.3 percent. This mortar cement was subjected to evaluation as reflected in Table 3 below: The average score was 3.6, indicating that the performance of this sample, which contained only surfactants and PEG for water retention, was not as good as the sample described in Table 1, which contained both the diutan biopolymer and surfactants, and which had an average score of 4.7.

TABLE 3

| time of test | Workability | Creaminess | Bleeding | Stickiness |
|---|---|---|---|---|
| Initial | 5 | 5 | 4 | 4 |
| 30 min | 4 | 4 | 4 | 4 |
| 60 min | 3 | 3 | 3 | 3 |
| 90 min | 3 | 3 | 3 | 3 |

Example 4

When a commercially available masonry cement additive was tested (containing other surfactants but not with any biopolymers), performance was not as good as with the use of diutan biopolymer and surfactants. The mortar cement was constituted as follows: ASTM C-1328 (2003) Type M Cement (1200 g), all purpose sand (4800 g), water (750 g). This commercially available masonry cement additive was used in an amount of 750 ppm based on weight of cement. The percentage of air in the mortar cement containing the commercially available additive was determined to be 22.9 percent. This mortar cement was subjected to evaluation as reflected in Table 4 below. The average number was 2.9, indicating that the sample did not perform as well as the sample of the present invention (Table 1), which had an average of 4.7.

TABLE 4

| time of test | Workability | Creaminess | Bleeding | Stickiness |
|---|---|---|---|---|
| Initial | 4 | 4 | 4 | 4 |
| 30 min | 4 | 3 | 3 | 3 |
| 60 min | 3 | 3 | 3 | 3 |
| 90 min | 3 | 1 | 1 | 1 |

Example 5

Compared to mortar 1, when a lower level of diutan S-657 biopolymer is used (650 ppm on cement compared to 1150 ppm), the masonry technician ratings are lower (4.0 overall vs. 4.7). The impact of a higher level of diutan S-657 biopolymer on the quality of the masonry mortar is evident in the quality of the mortar.

A test additive composition was made by combining the following components in the percentages outlined below:

| Liquid Component | Percentage in formulation |
|---|---|
| Water | 62 |
| V-MAR ® 3 composition | 25 |
| Sodium Alkyl (mainly lauryl) Ethoxy Sulfate in Aqueous Solution, 28% | 9 |
| Sodium lauriminodipropionate (30% aqueous) | 4 |

This composition was tested at 2600 ppm (liquid weight on weight of cement material). With this total dosage, the dosage of each component based on weight of cement material is as follows:

| Liquid Component | Liquid dosage (ppm on cement) | Active component | Active dosage (ppm on cement) |
|---|---|---|---|
| V-MAR ® 3 composition | 650 | Diutan biopolymer | 6.5 |
| Sodium Alkyl (mainly lauryl) Ethoxy Sulfate in Aqueous Solution, 28% | 234 | Sodium Alkyl (mainly lauryl) Ethoxy Sulfate | 65.5 |
| Sodium lauriminodipropionate (30% aqueous) | 104 | Sodium lauriminodipropionate | 31.2 |

The mortar cement was constituted as follows: ASTM C-1328 (2003) Type M Cement (1200 g), all-purpose sand (4800 g), and water (782.4 g). The percentage of air in the mortar cement was determined to be 23.6 percent. This mortar cement was subjected to evaluation by masons as reflected in Table 5 below: The average score was 4.0.

TABLE 5

| time of test | Workability | Creaminess | Bleeding | Stickiness |
|---|---|---|---|---|
| Initial | 5 | 5 | 4 | 4 |
| 30 min | 5 | 5 | 4 | 4 |
| 60 min | 4 | 4 | 4 | 4 |
| 90 min | 3 | 3 | 3 | 3 |

Example 6

For ease of formulation, diutan S-657 biopolymer is dispersed in water as described in patent application US 2004072939 A1. The art in this patent describes the product available from Grace Construction Products, Cambridge, USA, under the trade name V-MAR®™ 3 in the above examples. Duitan biopolymer can also be dispersed using a non-aqueous carrier, such as polyethylene glycol or other cement grinding aids, which may be added to the formulation, such as triethanolamine, diethylene glycol, triisopropanolamine (See e.g., U.S. Pat. No. 4,943,323) or hydroxyamines such as N,N-bis(2-hydroxyethyl)-2-propanolamine or such other amines as disclosed in U.S. Pat. Nos. 6,048,393; 6,290,772; alkanolamines such as disclosed in U.S. Pat. No. 6,358,311; and the triethanolamine/tetrahydroxyethylethylene diamine compositions described in U.S. Pat. No. 7,160,384 of Jardine.

Example 7

The surfactants were tested similar to Example 3 but without the use of polyethylene glycol as a water retention aid and workability aid. Combining the following components in the percentages outlined below provided a test additive composition.

A test additive composition was made by combining the following components in the percentages outlined below:

| Liquid Component | Percentage in formulation |
|---|---|
| Water | 71.1 |
| Sodium Alkyl (mainly lauryl) Ethoxy Sulfate in Aqueous Solution, 28% | 20 |
| Sodium lauriminodipropionate (30% aqueous) | 8.9 |

This composition was tested at 1035 ppm (liquid weight on cement material). With this total dosage, the dosage of each component based on weight of cement material is as follows:

| Liquid Component | Liquid dosage (ppm on cement) | Active component | Active dosage (ppm on cement) |
|---|---|---|---|
| Sodium Alkyl (mainly lauryl) Ethoxy Sulfate in Aqueous Solution, 28% | 207 | Sodium Alkyl (mainly lauryl) Ethoxy Sulfate | 58 |
| Sodium lauriminodipropionate (30% aqueous) | 92 | Sodium lauriminodipropionate | 27.6 |

This mortar cement was subjected to evaluation by masons as reflected in Table 6 below: The average score was 3.4.

TABLE 6

| time of test | Workability | Creaminess | Bleeding | Stickiness |
|---|---|---|---|---|
| Initial | 5 | 5 | 4 | 4 |
| 30 min | 5 | 5 | 4 | 4 |
| 60 min | 3 | 3 | 3 | 3 |
| 90 min | 2 | 1 | 2 | 2 |

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Skilled artisans can make variations and changes without departing from the spirit of the invention.

We claim:

1. A method for increasing workability and sand-carrying capacity of a mortar cement useful for stucco applications, comprising:
   introducing to an uncured mortar cement the following:
   (a) diutan in an amount no less than 1.0 ppm and no greater than 100.0 ppm;
   (b) sodium alkyl ethoxy sulfate in an amount no less than 2.8 ppm and no greater than 2800 ppm; and
   (c) sodium laurimidodipropionate in an amount no less than 1.5 ppm and no greater than 180 ppm;
   all ppm (parts-per-million) amounts herein being expressed in terms of dry weight actives based on dry weight of cement material including cement binder and any secondary cementitious materials.

2. The method of claim 1 wherein said uncured mortar cement comprises sand graded in accordance with ASTM C-897 (2000).

3. A mortar cement composition provided by the method of claim 2.

4. The method of claim 1 wherein said sodium alkyl ethoxy sulfate is sodium lauryl ethoxy sulfate.

5. The method of claim 1 wherein said components (a) through (c) are introduced to cement clinker before or during the intergrinding manufacture process of said cement clinker to produce cement.

6. The method of claim 1 wherein said components (a) through (c) are introduced in the form of an aqueous solution.

7. The method of claim 1 wherein said components (a) through (c) are introduced in the form of a non-aqueous solution.

8. A method for increasing workability and sand-carrying capacity of a mortar cement useful for stucco applications, comprising:
   introducing to cement clinker, before or during the intergrinding manufacture process of said cement clinker to produce cement, the following components in an aqueous or non-aqueous solution:
   (a) diutan in an amount no less than 1.0 ppm and no greater than 100.0 ppm;
   (b) sodium lauryl ethoxy sulfate in an amount no less than 2.8 ppm and no greater than 2800 ppm; and
   (c) sodium laurimidodipropionate in an amount no less than 1.5 ppm and no greater than 180 ppm;
   all ppm (parts-per-million) amounts herein being expressed in terms of dry weight actives based on dry weight of cement material including cement binder and any secondary cementitious materials.

* * * * *